US010088380B2

(12) United States Patent
Richey et al.

(10) Patent No.: US 10,088,380 B2
(45) Date of Patent: Oct. 2, 2018

(54) METHOD AND SYSTEM FOR A SAMPLE FILTER VISUAL CONTAMINATION CHECK

(71) Applicant: General Electric Company, Schenectady, NY (US)

(72) Inventors: Jeffrey Dale Richey, Cincinnati, OH (US); Joshua Daniel Brown, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 352 days.

(21) Appl. No.: 14/959,680

(22) Filed: Dec. 4, 2015

(65) Prior Publication Data

US 2017/0160159 A1    Jun. 8, 2017

(51) Int. Cl.
| | | |
|---|---|---|
| *G01L 15/00* | (2006.01) | |
| *G01L 19/06* | (2006.01) | |
| *G01M 15/14* | (2006.01) | |
| *G01L 19/08* | (2006.01) | |
| *G01L 23/26* | (2006.01) | |

(52) U.S. Cl.
CPC .......... *G01L 19/0636* (2013.01); *G01L 15/00* (2013.01); *G01L 19/08* (2013.01); *G01L 23/26* (2013.01); *G01M 15/14* (2013.01)

(58) Field of Classification Search
CPC ..... G01L 19/0636; G01L 19/08; G01L 19/06; G01L 19/0627; G01L 15/00; G01L 23/06; G01M 15/14
See application file for complete search history.

(56) References Cited

U.S. PATENT DOCUMENTS

| | | | |
|---|---|---|---|
| 2,757,632 A | 8/1956 | Wittlin | |
| 3,026,609 A | 3/1962 | Bryan | |
| 3,930,412 A * | 1/1976 | Mallon | ................ G01L 9/0054 338/4 |
| 4,166,430 A | 9/1979 | Johnson, Jr. | |
| 4,912,981 A * | 4/1990 | King | .................. G01L 19/0636 73/706 |
| 5,876,471 A | 3/1999 | Lippert et al. | |
| 6,549,856 B2 | 4/2003 | Baker | |
| | (Continued) | | |

FOREIGN PATENT DOCUMENTS

EP            0008070 A1    2/1980

*Primary Examiner* — Blake A Tankersley
(74) *Attorney, Agent, or Firm* — General Electric Company; Pamela Kachur

(57) ABSTRACT

A multi-channel pressure measuring device includes a plurality of sample conduits and a plurality of sample inlets. Each sample inlet is configured to receive a respective sample conduit. The sample conduit is configured to channel a sample fluid and an incidental fluid through a respective sample inlet. The multi-channel pressure measuring device also includes a sample block including a plurality of collection wells coupled to the sample inlets. Each collection well includes a diameter larger than a diameter of a respective sample inlet. The sample block is fabricated from at least one of a transparent material and a translucent material. The multi-channel pressure measuring device further includes a plurality of filter indicator elements. Each filter indicator element is positioned within a respective collection well. Each filter indicator element is configured to retain the incidental fluid therewithin and to indicate a presence of the retained incidental fluid.

20 Claims, 4 Drawing Sheets

(56) References Cited

U.S. PATENT DOCUMENTS

| | | |
|---|---|---|
| 7,292,701 B2 | 11/2007 | Norgaard et al. |
| 7,886,875 B2 | 2/2011 | Shevchenko et al. |
| 8,776,803 B2 | 7/2014 | Tarora et al. |
| 2001/0020601 A1 | 9/2001 | Gabele et al. |
| 2012/0016603 A1 | 1/2012 | Martin et al. |
| 2013/0333449 A1 | 12/2013 | Barraclough et al. |
| 2016/0139091 A1* | 5/2016 | Ruppel .................. G01N 30/16 73/23.37 |

* cited by examiner

METHOD AND SYSTEM FOR A SAMPLE FILTER VISUAL CONTAMINATION CHECK

BACKGROUND

The field of the disclosure relates generally to testing of gas turbine engines and, more particularly, to a method and system for inline filtration of pressure lines connected to pressure scanners.

During test flights of experimental gas turbine engines various process parameters are measured using a multi-channel scanner. The measured data is then stored in the multi-channel scanner. The scanner is configured to simultaneously measure hundreds or thousands of locations within the experimental gas turbine engine during a test flight. However, known process scanners require a clean, dry sample from each location being measured to properly measure the sample data. Entrained oil in a sample line between the measured location and the scanner can contaminate the sample scanner, which can negatively affect the test results including losing all sample data collected during the test.

BRIEF DESCRIPTION

In one aspect, a multi-channel pressure measuring device includes a plurality of sample conduits and a plurality of sample inlets. Each sample inlet of the plurality of sample inlets is configured to each receive a respective sample conduit from the plurality of sample conduits. The sample conduit is configured to channel at least one of a sample fluid and an incidental fluid through a respective sample inlet. The multi-channel pressure measuring device also includes a sample block including a plurality of collection wells coupled to the plurality of sample inlets. Each collection well of the plurality of collection wells includes a diameter larger than a diameter of a respective sample inlet. The sample block fabricated from at least one of a transparent material and a translucent material. The multi-channel pressure measuring device further includes a plurality of filter indicator elements. Each filter indicator element of the plurality of filter indicator elements positioned within a respective collection well. Each filter indicator element configured to retain the incidental fluid therewithin and to indicate a presence of the retained incidental fluid.

In another aspect, a method of measuring pressure includes receiving a plurality of sample conduits from a plurality of measured locations to a plurality of sample inlets. Each sample conduit of the plurality of sample conduits contains a sample fluid and an incidental fluid. Each respective sample conduit of the plurality of sample conduits channels the sample fluid and the incidental fluid from an associated measured location of the plurality of measured locations to an associated sample inlet of the plurality of sample inlets. The method also includes channeling the sample fluid and the incidental fluid from the plurality of sample inlets to a plurality of collection wells. Each respective sample inlet of the plurality of sample inlets channels the sample fluid and the incidental fluid to an associated collection well of the plurality of collection wells. The method further includes detecting a presence of the incidental fluid in at least one of the collection wells of the plurality of collection wells. The method also includes visually indicating the presence of the incidental fluid.

In yet another aspect, a system for indicating a presence of oil includes a test device including a plurality of measured locations. The system also includes a pressure measuring device including a plurality of sample conduits. Each measured location of the plurality of measured locations configured to each receive a respective sample conduit from the plurality of sample conduits. The sample conduit configured to channel at least one of a sample fluid and an incidental fluid from a respective measured location. The pressure measuring device also includes a plurality of sample inlets. Each sample inlet of the plurality of sample inlets is configured to each receive a respective sample conduit from the plurality of sample conduits. The sample conduit is configured to channel at least one of a sample fluid and an incidental fluid through a respective sample inlet. The measuring device also includes a sample block including a plurality of collection wells coupled to the plurality of sample inlets. Each collection well of the plurality of collection wells includes a diameter larger than a diameter of a respective sample inlet. The sample block fabricated from at least one of a transparent material and a translucent material. The measuring device further includes a plurality of filter indicator elements. Each filter indicator element of the plurality of filter indicator elements positioned within a respective collection well. Each filter indicator element configured to retain the incidental fluid therewithin and to indicate a presence of the retained incidental fluid.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 1 is a perspective view of an exemplary pressure scanner assembly.

FIG. 2 is a perspective view of an exemplary connector manifold.

FIG. 3 is a schematic view of an exemplary connector manifold.

FIG. 4 is a cut away schematic view of an exemplary connector manifold.

Figure 1:
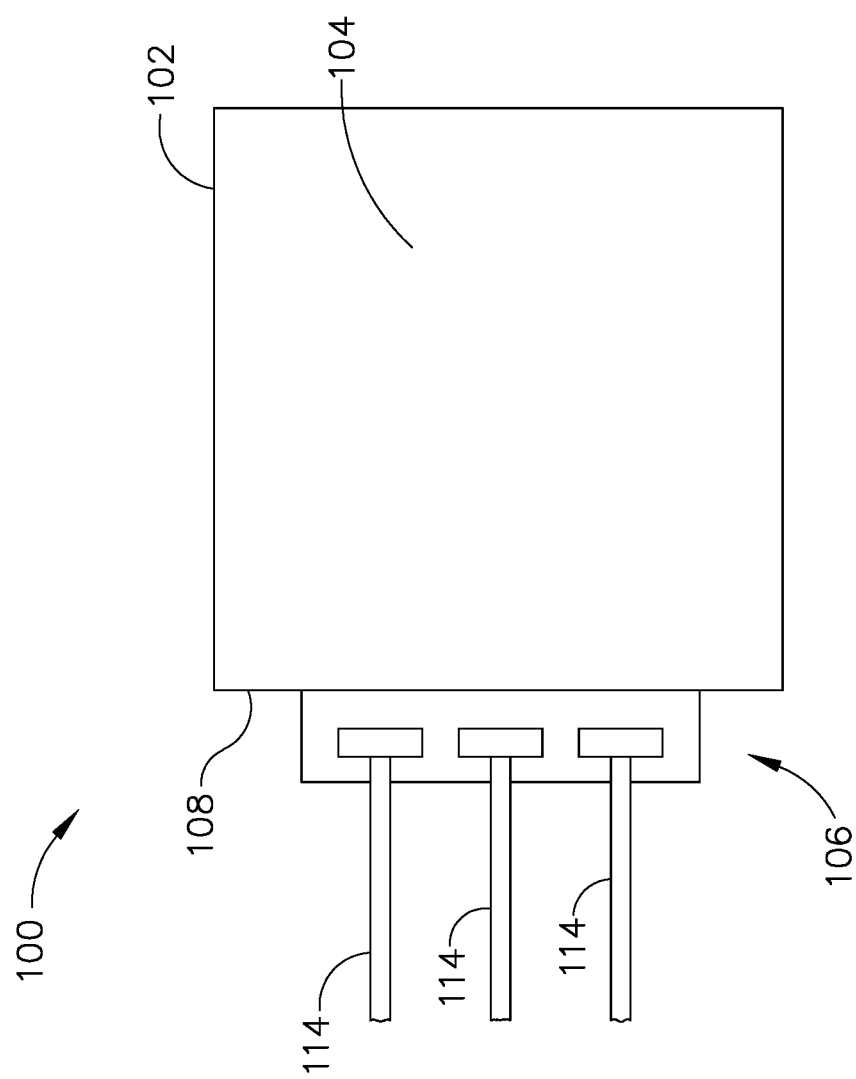
FIGS. 1-4 show example embodiments of the method and apparatus described herein.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The following detailed description illustrates embodiments of the disclosure by way of example and not by way of limitation. It is contemplated that the disclosure has general application to a method and system for inline filtration of pressure lines connected to pressure scanners.

Embodiments of an inline oil filter assembly are described herein. The inline oil filters are configured to collect entrained oil in a sample line of the pressure scanner and to indicate its presence during testing of a gas turbine engine. The inline oil filter assembly includes a filter block, a plurality of oil collection wells, and a plurality of oil filter indicator elements. The inline oil filter indicator elements are configured to remove oil from the sample tubing connected to the gas turbine engine. At least some of the sample locations can contain entrained oil, which can be carried to the inlet of the pressure scanner. The entrained oil enters a collection well within the inline oil filter assembly. The diameter of the well is significantly larger than the diameter of the tubing connected to the gas turbine engine. The larger diameter of the well reduces the velocity of the sample and allows gravity to de-entrain oil from the gas. The de-entrained oil is trapped in the filter indicator element in the well and the oil-free gas enters the pressure scanner. The filter indicator element within the well changes color when de-entrained oil contacts the element and provides an indication that oil is present in the tubing. The inline oil filter assembly is formed of a translucent or transparent material, allowing operators to visually check the indicator elements for oil in the tubing without disassembly of the inline oil filter assembly of pressure scanner.

The inline oil filter assembly described herein offers advantages over known methods of channeling sample gas to a pressure scanner. More specifically, the inline oil filter assembly described herein effectively removes oil from the sample gas stream to allow accurate measurement of the pressure. Removing oil from the sample gas without using a mechanical filter, which tends to plug the sample line, maintains the accuracy of the pressure measurement. Furthermore, filtering oil from the gas stream preserves the pressure scanner.

FIG. 1 is a perspective view of an exemplary pressure scanner assembly 100. Pressure scanner assembly 100 includes a pressure scanner housing 102 with a pressure scanner 104 disposed within. Pressure scanner 104 is an instrumentation device that measures a pressure parameter at a plurality of measured locations within a component, such as, but not limited to, a gas turbine engine (not shown in FIG. 1). Pressure scanner assembly 100 also includes a plurality of connector manifolds 106 fixedly coupled to an outer surface 108 of pressure scanner housing 102.

Pressure scanner 104 includes a plurality of sample inlets (not shown in FIG. 1). Sample inlets (not shown in FIG. 1) are coupled in flow communication with a plurality of pressure scanner assembly pressure tubes (not shown in FIG. 1) which are coupled in flow communication within connector manifolds 106. Pressure scanner 104 includes a plurality of sensors (not shown in FIG. 1) that measure and record pressure. Connector manifolds 106 are coupled in flow communication with a plurality of engine assembly pressure tubes 114 which are coupled in flow communication with a gas turbine engine (not shown in FIG. 1).

During operation, engine assembly pressure tubes 114 are connected to various measured locations within a gas turbine engine (not shown in FIG. 1). Engine assembly pressure tubes 114 are configured to deliver pressurized gas to connector manifolds 106. Connector manifolds 106 are configured to deliver pressurized gas to pressure scanner assembly pressure tubes (not shown in FIG. 1) which are configured to deliver pressurized gas to sample inlets (not shown in FIG. 1). Sample inlets (not shown in FIG. 1) are configured to deliver pressurized gas to sensors (not shown in FIG. 1) that measure and record pressure within pressure scanner 104.

Figure 2:
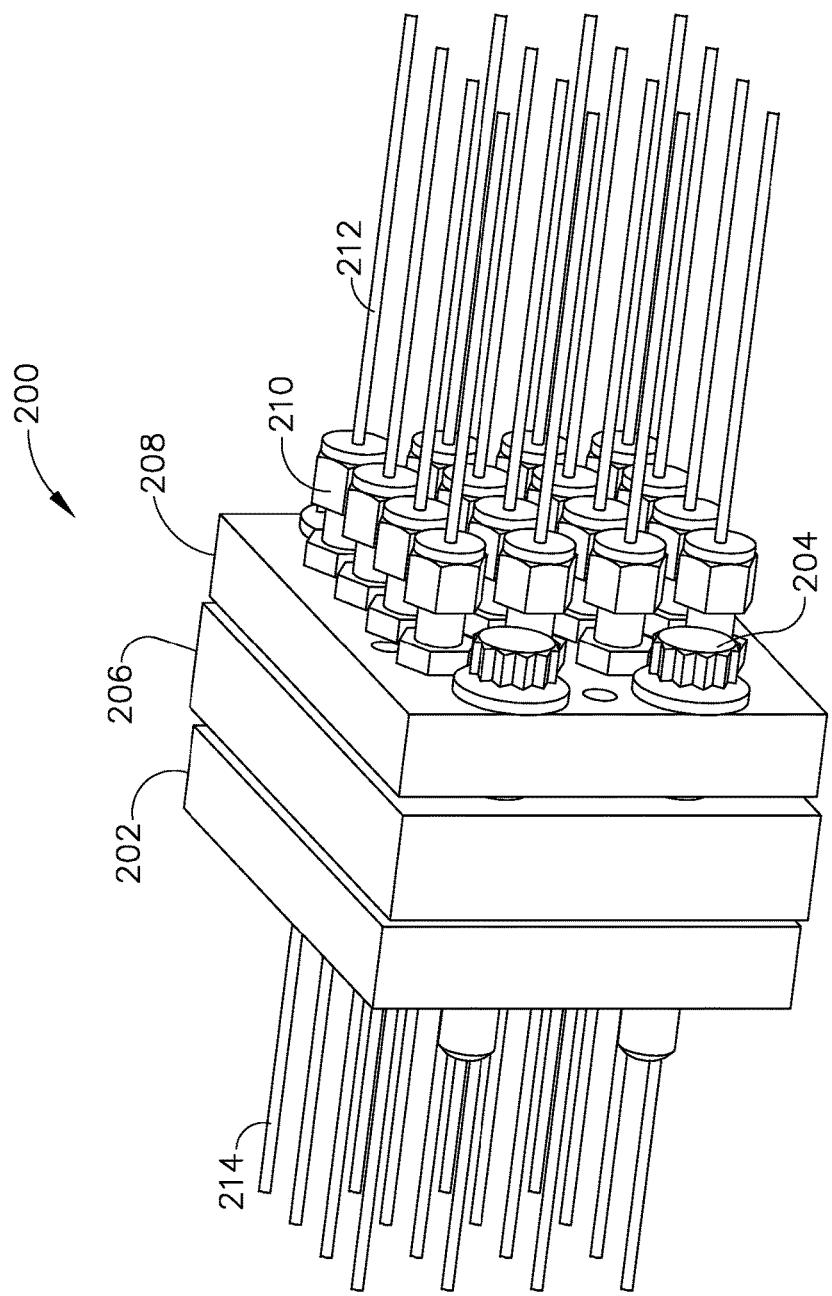

FIG. 2 is a perspective view of an exemplary connector manifold 200. Connector manifold 200 includes a connector manifold base 202 fixedly coupled to outer surface 108 of pressure scanner housing 102 (shown in FIG. 1) by a plurality of fasteners 204. Connector manifold base 202 is fixedly coupled to a sample block 206 which is fixedly coupled to a connector manifold cover 208. Connector manifold cover 208 is fixedly coupled to a plurality of connectors 210 which are coupled in flow communication with a plurality of engine assembly pressure tubes 212. Engine assembly pressure tubes 212 are coupled in flow communication with a gas turbine engine (not shown in FIG. 2). Connector manifold base 202 is coupled in flow communication with a plurality of pressure scanner assembly pressure tubes 214 which are coupled in flow communication with sample inlets (not shown in FIG. 2).

During operation, engine assembly pressure tubes 212 are connected to various measured locations within a gas turbine engine (not shown in FIG. 1). Engine assembly pressure tubes 212 are configured to deliver pressurized gas to connectors 210 which are configured to deliver pressurized gas to connector manifolds 200. Connector manifolds 200 are configured to deliver pressurized gas to pressure scanner assembly pressure tubes 214 which are configured to deliver pressurized gas to sample inlets (not shown in FIG. 2). Sample inlets (not shown in FIG. 2) are configured to deliver pressurized gas to sensors (not shown in FIG. 2) that measure and record pressure within pressure scanner 104 (shown in FIG. 1).

Figure 3:
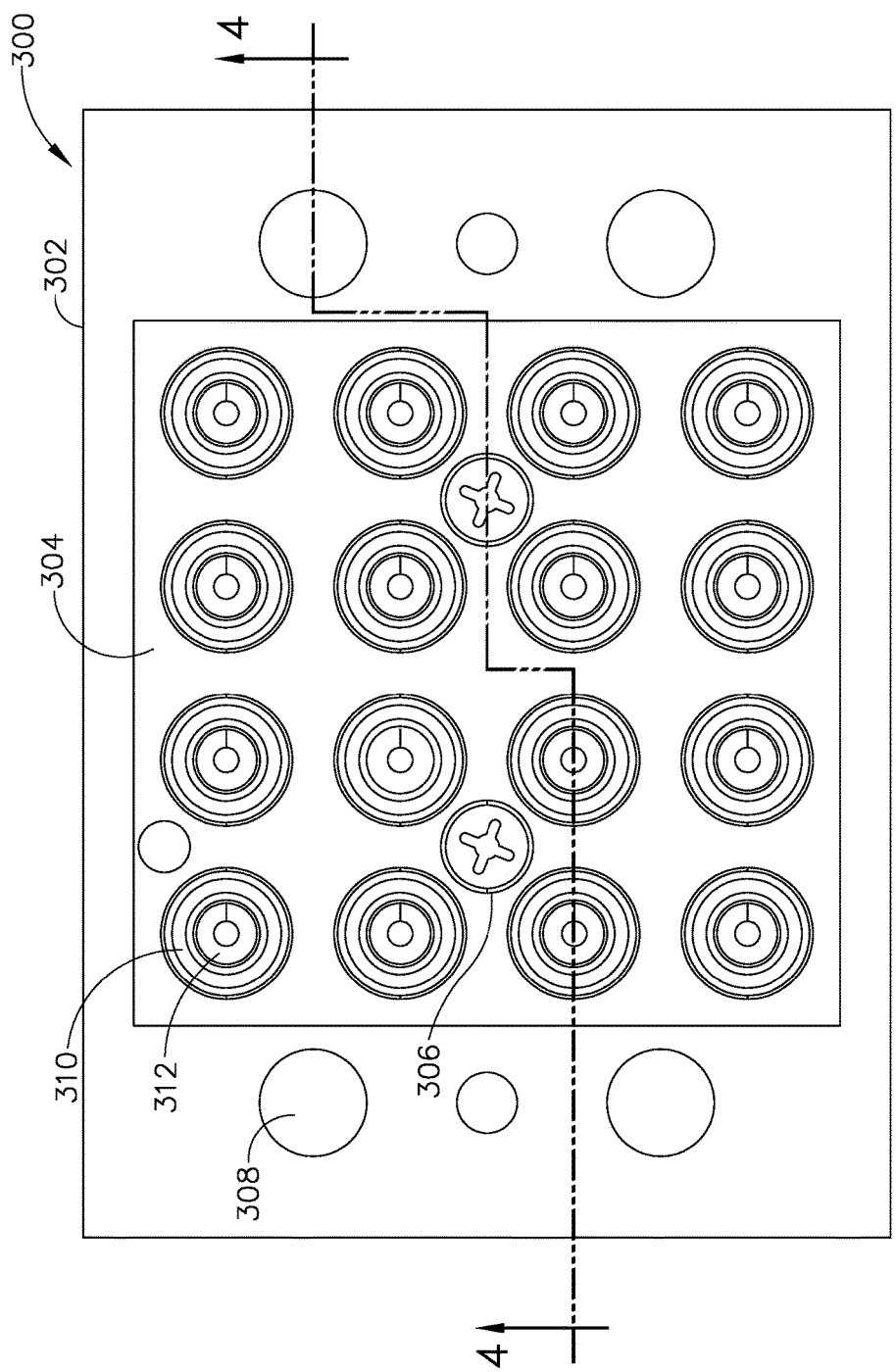

FIG. 3 is a schematic view of an exemplary connector manifold 300. Connector manifold 300 includes a sample block 302 fixedly coupled to a connector manifold cover 304 by a plurality of fasteners 306. Sample block 302 is fixedly coupled to outer surface 108 of pressure scanner housing 102 (shown in FIG. 1) by a plurality of fasteners 204 (shown in FIG. 2) through a plurality of fastener apertures 308. Sample block 302 and connector manifold cover 304 include a plurality of collection wells 310. A plurality of filter indicator elements 312 are disposed within collection wells 310.

The diameter of collection wells 310 is larger than the diameter of engine assembly pressure tubes 212 (shown in FIG. 2), pressure scanner assembly pressure tubes 214 (shown in FIG. 2), and sample inlets (not shown in FIG. 3). Sample block 302 is formed of a transparent or translucent material. Filter indicator elements 312 are formed of an oleophilic material which provides a visual indication when oil is present in collection wells 310.

During operation, engine assembly pressure tubes 212 (shown in FIG. 2) are configured to deliver pressurized gas to collection wells 310 which are configured to deliver pressurized gas to pressure scanner assembly pressure tubes 214 (shown in FIG. 2) and sample inlets (not shown in FIG. 3). The larger diameter of collection wells 310 reduces the velocity of the sample and allows gravity to de-entrain oil from the pressurized gas. The de-entrained oil is trapped in filter indicator elements 312 in collection wells 310 and the oil-free pressurized gas enters pressure scanner 104 (shown in FIG. 1). Filter indicator elements 312 within collection wells 310 changes color when de-entrained oil contacts filter indicator elements 312 and provides visual indication that oil is present in pressure scanner assembly pressure tubes 214 (shown in FIG. 2) and sample inlets (not shown in FIG. 3). Sample block 302 is formed of a translucent or transparent material, allowing operators to visually check filter indicator elements 312 for oil in pressure scanner assembly pressure tubes 214 (shown in FIG. 2) and sample inlets (not shown in FIG. 3) without disassembly of pressure scanner assembly 100 (shown in FIG. 1).

Figure 4:
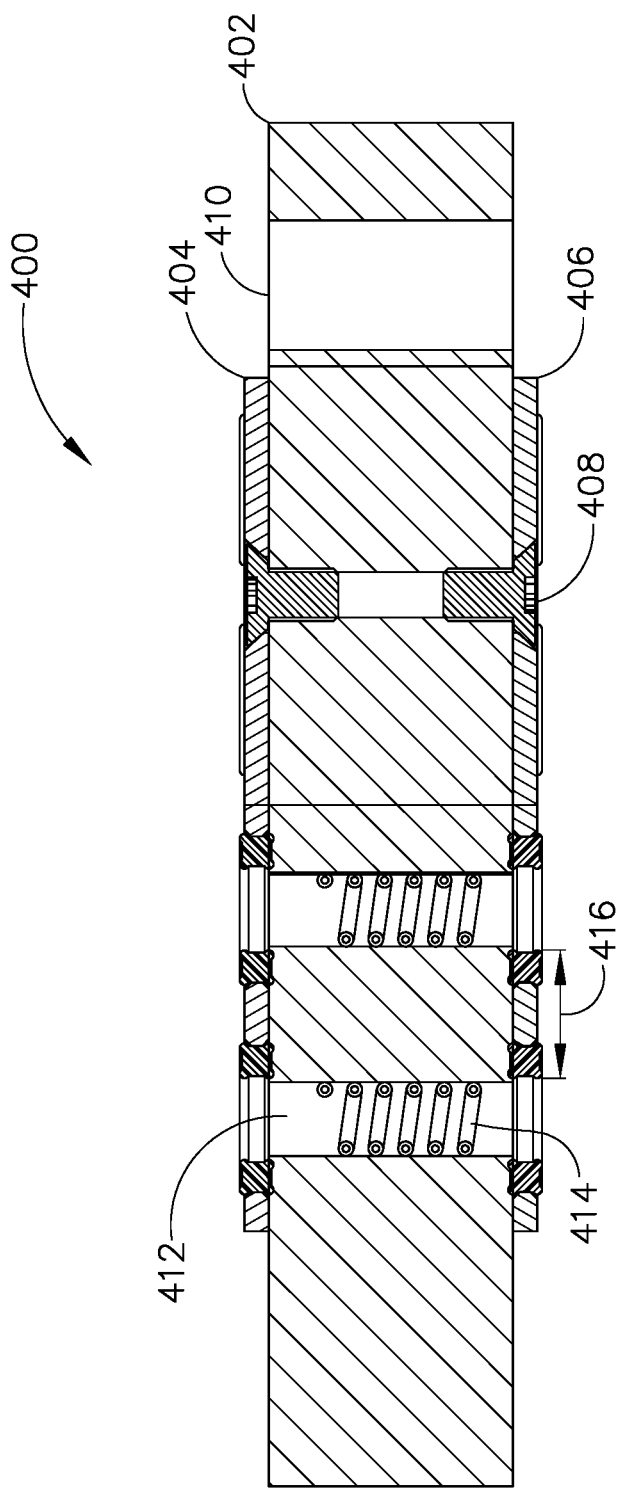

FIG. 4 is a cut away schematic view of an exemplary connector manifold 400. Connector manifold 400 includes a sample block 402 fixedly coupled to a connector manifold cover 404 and a connector manifold base 406 by a plurality of fasteners 408. Sample block 402 is fixedly coupled to outer surface 108 of pressure scanner housing 102 (shown in FIG. 1) by a plurality of fasteners 204 (shown in FIG. 2) extending at least partially through each of a plurality of fastener apertures 410. Sample block 402, connector manifold cover 404, and connector manifold base 406 includes a plurality of collection wells 412. A plurality of filter indicator elements 414 is disposed within collection wells 412. A portion 416 of sample block 402 is disposed between collection wells 412. A width of portion 416 of sample block 402 is determined by calculating the amount of sample block 402 material necessary to ensure the structural integrity of sample block 402 during operation.

The above-described inline oil filters provide an efficient method for collecting entrained oil in sample lines and indicating its presence. Specifically, the above-described inline oil filters allows operators to detect entrained oil in sample lines without disassembly of the multi-channel pressure scanner. Additionally, the inline oil filter removes entrained oil from sample lines without reducing the pressure in the sample lines, allowing for accurate pressure measurements.

Exemplary embodiments of inline oil filters are described above in detail. The inline oil filters, and methods of operating such filters and devices are not limited to the specific embodiments described herein, but rather, components of inline oil filters and/or steps of the methods may be utilized independently and separately from other components and/or steps described herein. For example, the methods may also be used in combination with other systems requiring oil filtration, and are not limited to practice with only the systems and methods as described herein. Rather, the exemplary embodiment can be implemented and utilized in connection with many other machinery applications that are currently configured to receive and accept pressurized gas.

Example methods and apparatus for filtering oil to a multi-channel pressure scanner are described above in detail. The apparatus illustrated is not limited to the specific embodiments described herein, but rather, components of each may be utilized independently and separately from other components described herein. Each system component can also be used in combination with other system components.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A multi-channel pressure measuring device comprising:
   a plurality of sample conduits;
   a plurality of sample inlets, each sample inlet of said plurality of sample inlets configured to each receive a respective sample conduit from said plurality of sample conduits, said sample conduit configured to channel at least one of a sample fluid and an incidental fluid through a respective said each sample inlet;
   a sample block comprising a plurality of collection wells coupled to said plurality of sample inlets, each said collection well of said plurality of collection wells comprising a diameter larger than a diameter of a respective said sample inlet, said sample block fabricated from at least one of a transparent material and a translucent material;
   a plurality of filter indicator elements, each filter indicator element of said plurality of filter indicator elements positioned within a respective collection well, said each filter indicator element configured to retain the incidental fluid therewithin and to indicate a presence of the retained incidental fluid; and
   a pressure scanner in fluid communication with the sample inlets and which has sensors configured to measure pressure within the pressure scanner.

2. The multi-channel pressure measuring device of claim 1, wherein said filter indicator element comprises an oleophilic material.

3. The multi-channel pressure measuring device of claim 1, wherein said filter indicator element comprises at least one of a filter paper, a ceramic material, and a fiberglass material.

4. The multi-channel pressure measuring device of claim 1, wherein said sample block comprises at least one of a polycarbonate resin, a polymethyl methacrylate material, and a glass material.

5. The multi-channel pressure measuring device of claim 1, wherein said incidental fluid comprises oil.

6. The multi-channel pressure measuring device of claim 1, wherein said sample fluid comprises pressurized gas.

7. A method of measuring pressure comprising:
   receiving a plurality of sample conduits from a plurality of measured locations to a plurality of sample inlets, each sample conduit of the plurality of sample conduits containing a sample fluid and an incidental fluid, each respective sample conduit of the plurality of sample conduits channeling the sample fluid and the incidental fluid from an associated measured location of the plurality of measured locations to an associated sample inlet of the plurality of sample inlets;

channeling the sample fluid and the incidental fluid from the plurality of sample inlets to a plurality of collection wells, each respective sample inlet of the plurality of sample inlets channeling the sample fluid and the incidental fluid to an associated collection well of the plurality of collection wells;

detecting a presence of the incidental fluid in at least one of the collection wells of the plurality of collection wells;

visually indicating the presence of the incidental fluid; and measuring the pressure of the plurality of measured locations using a pressure scanner which is in fluid communication with the sample inlets.

8. The method of claim 7, wherein the detecting of the presence of the incidental fluid in at least one of the collection wells comprises contacting the incidental fluid with a filter indicator element.

9. The method of claim 7, wherein the visually indicating of the presence of the incidental fluid comprises visually indicating a filter indicator element.

10. The method of claim 7, wherein the receiving of the plurality of sample conduits from each of the plurality of respective measured locations to the plurality of sample inlets comprises receiving a plurality of pressurized gas samples from each of the plurality of respective measured locations to the plurality of sample inlets.

11. The method of claim 7, wherein the detecting of the presence of the incidental fluid in at least one of the collection wells comprises detecting a presence of oil in at least one of the collection wells.

12. The method of claim 7, wherein the detecting of the presence of the incidental fluid in at least one of the collection wells comprises contacting the incidental fluid with at least one of a filter paper, a ceramic material, and a fiberglass material.

13. The method of claim 7, wherein the channeling of the sample fluid and the incidental fluid from each respective sample inlet to an associated collection well comprises channeling the sample fluid and the incidental fluid from each respective sample inlet to a sample block comprising the plurality of collection wells for each sample inlet of the plurality of sample inlets, said collection wells each comprising a diameter larger than a diameter of a respective sample inlet, said sample block formed of at least one of a transparent material and a translucent material.

14. A system for indicating a presence of oil in a pressure sensor comprising:
a test device comprising a plurality of measured locations;
a pressure measuring device comprising:
a plurality of sample conduits, each measured location of said plurality of measured locations configured to each receive a respective sample conduit from said plurality of sample conduits, said sample conduit configured to channel at least one of a sample fluid and an incidental fluid from a respective said each measured location;
a plurality of sample inlets, each sample inlet of said plurality of sample inlets configured to each receive a respective sample conduit from said plurality of sample conduits, said sample conduit configured to channel at least one of said sample fluid and said incidental fluid through a respective said each sample inlet;
a sample block comprising a plurality of collection wells coupled to said plurality of sample inlets, each said collection well of said plurality of collection wells comprising a diameter larger than a diameter of a respective said sample inlet, said sample block fabricated from at least one of a transparent material and a translucent material; and
a plurality of filter elements, each filter indicator element of said plurality of filter indicator elements positioned within a respective collection well, said each filter indicator element configured to retain the incidental fluid therewithin and to indicate a presence of the retained incidental fluid.

15. The system of claim 14, wherein said filter indicator element comprising an oleophilic material.

16. The system of claim 14, wherein said filter indicator element comprises at least one of a filter paper, a ceramic material, and a fiberglass material.

17. The system of claim 14, wherein said sample block comprises at least one of a polycarbonate resin, a polymethyl methacrylate material, and a glass material.

18. The system of claim 14, wherein said incidental fluid comprises oil.

19. The system of claim 14, wherein said sample fluid comprises pressurized gas.

20. The system of claim 14, wherein said testing device comprises a gas turbine engine.

* * * * *